(12) United States Patent
Sahuc et al.

(10) Patent No.: US 7,502,862 B2
(45) Date of Patent: Mar. 10, 2009

(54) DATA TRANSMISSION DEVICE AND DATA RECEPTION DEVICE USING PREDETERMINED PROFILES

(75) Inventors: David Sahuc, Rennes (FR); Paul Kerbiriou, Thorigne Fouillard (FR)

(73) Assignee: Thomson Licensing, Boulogne-Billancourt (FR)

( * ) Notice: Subject to any disclaimer, the term of this patent is extended or adjusted under 35 U.S.C. 154(b) by 961 days.

(21) Appl. No.: 10/402,045

(22) Filed: Mar. 28, 2003

(65) Prior Publication Data

US 2003/0195988 A1      Oct. 16, 2003

(30) Foreign Application Priority Data

Apr. 10, 2002   (FR)   .................................. 02 04574

(51) Int. Cl.
  *G06F 15/173*   (2006.01)
(52) U.S. Cl. ..................... 709/231; 709/230; 709/225; 709/220; 709/246
(58) Field of Classification Search .................. 709/231
   See application file for complete search history.

(56) References Cited

U.S. PATENT DOCUMENTS

| | | | | |
|---|---|---|---|---|
| 5,953,506 | A * | 9/1999 | Kalra et al. | 709/231 |
| 5,983,022 | A * | 11/1999 | Watkins et al. | 717/144 |
| 6,011,905 | A * | 1/2000 | Huttenlocher et al. | 358/1.2 |
| 6,345,279 | B1 * | 2/2002 | Li et al. | 707/104.1 |
| 6,490,627 | B1 * | 12/2002 | Kalra et al. | 709/231 |
| 6,594,798 | B1 * | 7/2003 | Chou et al. | 714/820 |
| 7,013,479 | B2 * | 3/2006 | Mori | 725/93 |
| 7,089,295 | B2 * | 8/2006 | Christfort et al. | 709/219 |
| 7,113,998 | B1 * | 9/2006 | Stern et al. | 709/231 |
| 2001/0029523 | A1 * | 10/2001 | Mcternan et al. | 709/205 |
| 2002/0120684 | A1 * | 8/2002 | Christfort et al. | 709/203 |
| 2002/0136298 | A1 * | 9/2002 | Anantharamu et al. | 375/240.12 |
| 2003/0135553 | A1 * | 7/2003 | Pendakur | 709/205 |

OTHER PUBLICATIONS

Ebrahimi et al., "MPEG-4 Natural Video Coding—An Overview", Signal Processing Image Communication, Elsevier Science Publishers, Amsterdam,, Netherlands, vol. 15, No. 4/5, Jan. 2000, pp. 365-385.
Koenen R., "Profiles and Levels in MPEG-4 Approach and Overview", Signal Processing Image Communication, Elsevier Science Publishers, Amsterdam, Netherlands, vol. 15, Jan. 2000, pp. 463-478.
Search Report for French Appln. No. 0204574 dated Nov. 11, 2002.

* cited by examiner

*Primary Examiner*—F. Zeender
*Assistant Examiner*—Ramsey Refai
(74) *Attorney, Agent, or Firm*—Joseph J. Laks

(57) ABSTRACT

A device for transmitting data to a plurality of client devices transmits the data according to a plurality of predetermined profiles. Each of the plurality of client devices is associated with at least one profile. The device includes a unit for adapting the content of the data to be transmitted as a function of the predetermined profiles by generating data groups. Each of the data groups represents the content to be transmitted according to a predetermined profile. The device also includes a unit for creating at least one data stream encapsulating the data groups adapted to the various profiles allowing the client devices to recover from the stream, the data groups adapted to their profile. The device further includes a unit for transmitting the stream created to the client devices.

8 Claims, 2 Drawing Sheets

DATA TRANSMISSION DEVICE AND DATA RECEPTION DEVICE USING PREDETERMINED PROFILES

The invention relates to a device for transmitting data to at least one client device, the data being transmitted according to a plurality of predetermined profiles, each client device being associated with at least one profile.

The invention also relates to a data reception device with which is associated a profile, receiving as input at least one data stream comprising data groups associated with various profiles, the device comprising means for receiving the data streams.

BACKGROUND OF THE INVENTION

The invention relates mainly to content adaptation as a function of the characteristics and the capabilities of client terminals for which this content is intended.

The interconnection of networks entails the interconnection of terminals having different capabilities in terms for example of display.

It is especially difficult for content creators to create different contents for all the recipient terminals and it is especially cumbersome for a network to transfer a specific content adapted to each terminal.

U.S. Pat. No. 5,953,506 describes a system making it possible to deliver an adaptive content to client terminals based on requests sent to the client device.

In that patent, a server creates a data set by creating so-called basic data and additional data. Thus, as a function of the profiles of the client terminals, various streams are created by concatenating the basic data and additional data. Each client device then sees itself transferring a stream created as a function of its specific features. A stream is therefore created on a per client device or per type of client device basis.

However, such a system requires numerous interactions between the server terminal and the client terminals, on the one hand through the recovery of the specific features of the client device by the server terminal so as to construct the stream and, on the other hand, through the sending of various streams for all the client terminals as a function of the specific features of the client device, the same stream therefore not being transmitted to all the client terminals.

The invention proposes a device based on the creation of an adaptive content intended for client terminals which may have different profiles.

BRIEF SUMMARY OF THE INVENTION

Accordingly, the invention proposes a device for transmitting data to at least one client device, the data being transmitted according to a plurality of predetermined profiles, each client device being associated with at least one profile, characterized in that it comprises:

means for adapting the content of the data to be transmitted as a function of the predetermined profiles by generating data groups, each data group representing the content to be transmitted according to a predetermined profile, means for creating at least one data stream encapsulating the data groups adapted to the various profiles allowing the client devices to recover from the stream, the data groups adapted to their profile, and means for transmitting the stream created to the client devices.

Thus, the device does not need necessarily to know the profile of each client, and this may make it possible to limit the exchanges between terminals and thus may make it possible to decrease the occupancy of the bandwidth.

The information contained in the stream is in itself sufficient and allows any terminal to recreate the content adapted to its profile without requiring supplementary means at the terminal level. The client device takes from the stream the information allowing it to obtain a content adapted to its profile.

According to a preferred embodiment, the predetermined profiles define hierarchical levels of the capability of the client devices.

The stream is created in such a way that each terminal can recover from the stream the data which correspond to its capability and it can thus receive a stream fully adapted to its capabilities even if this stream has not been created solely for it.

According to a preferred embodiment, the means for creating a data stream are designed to insert into data groups associated with a profile, a pointer making it possible to reference another data group complying with another profile.

In this way, the content is defined in such a way that each data group is related to another data group and it is therefore possible to reconstruct in the stream, in a graded manner, the data adapted to all the profiles.

According to a preferred embodiment, the transmission means are such that the data streams or the data groups are transmitted in carousel mode.

In this way, the reception terminals can easily recover the data, from the stream, at any moment and independently of the other terminals and of the transmission device.

According to a preferred embodiment, the data groups are designed to comprise a data group referencing the content of lowest profile and at least one data group comprising data making it possible to modify the data of the data group referencing the lowest profile so as to obtain data groups each referencing a profile of higher level.

Thus the terminals can recover the data from the stream in a hierarchical manner, beginning by recovering the data adapted to the terminals of low capability and enhancing the basic content by processing the data groups of higher profile. This may allow each terminal to take from the stream the data adapted to its capabilities.

According to a preferred embodiment, the transmission means are such that the data groups are transmitted in a single stream.

According to a preferred embodiment, the data groups are designed to comprise a header comprising at least one temporal label.

This temporal label makes it possible to reconstruct in an ordered manner the data groups so as to recover the profiles in a hierarchical manner. Moreover, this makes it possible to reconstruct the profiles from a basic profile when the data groups have to be processed in a hierarchical manner.

According to a variant, the means for creating at least one stream of data are designed to insert a node into the data groups associated with a profile, the node being designed to point to the data group of immediately higher profile.

Thus, it is also possible for the various profiles to be reconstructed also in a hierarchical manner.

According to a preferred embodiment, the means for creating a stream are such that the node points to a data group situated in another stream.

According to a preferred embodiment, at least one of said data groups is designed to comprise a header comprising at least the profile to which the data of the said group are adapted.

In this way, the reception device can decode only the profiles lower than its profile and ceases decoding the data of the stream when it has received the data group comprising data associated with its profile.

The invention also relates to a process for transmitting data to at least one client device, the data being transmitted according to a plurality of predetermined profiles, each client device being associated with at least one profile, characterized in that it comprises the steps of adapting the content of the data to be transmitted as a function of the predetermined profiles by generating data groups, each data group representing the content to be transmitted according to a predetermined profile, of creating at least one data stream encapsulating the data groups adapted to the various profiles allowing the client devices to recover from the stream, the data groups adapted to their profile, and of transmitting the stream created to the client terminals, the said transmission process preferably being implemented by means of a transmission device in accordance with any one of Claims 1 to 8.

The invention also relates to a data reception device with which is associated a profile, receiving as input at least one data stream comprising data groups associated with various profiles, the device comprising means for receiving data streams characterized in that it comprises means for recovering from the said stream the data adapted to its profile.

The invention also relates to a data reception process with which is associated a profile, receiving as input at least one data stream comprising data groups associated with various profiles, the process comprising a step of receiving data streams characterized in that it comprises a step of recovering from the said stream the data adapted to its profile.

The invention also relates to a computer program product comprising program code instructions for executing the steps of the data transmission process according to the invention, when the said program is executed on a computer.

The invention also relates to a computer program product comprising program code instructions for executing the steps of the data reception process according to the invention, when the said program is executed on a computer.

The expression "computer program product" is understood to mean any computer program medium, either in the form of a hardware medium (disk, diskette, cassette, etc), or in the form of a signal (electrical, optical, etc).

BRIEF DESCRIPTION OF THE DRAWINGS

The invention will be better understood and illustrated by means of advantageous exemplary embodiments and modes of implementation, which are in no way limiting, with reference to the appended figures in which.

DETAILED DESCRIPTION OF THE INVENTION

In a preferred embodiment described hereinbelow, the data are coded in a format complying with the MPEG-4 standard (MPEG standing for "Motion Picture Expert Group") defined in the ISO/IEC 14496-1.

In this preferred embodiment, the data groups are data coded according to the BIFS format (the acronym standing for "Binary Format for Scene")

Figure 1:
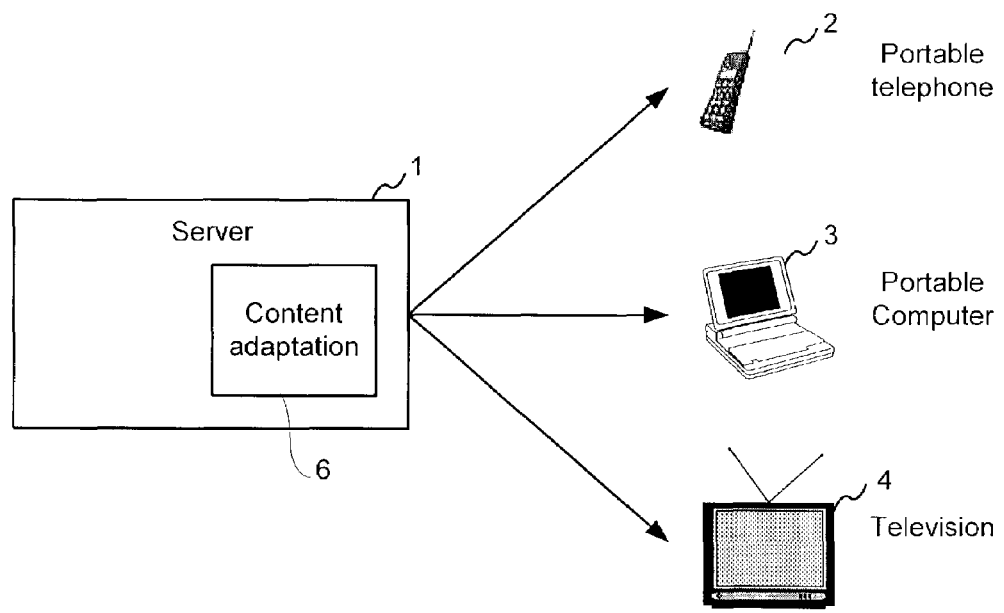
FIG. 1 represents an exemplary system implementing an embodiment of the invention.

FIG. 1 illustrates a system implementing an embodiment of the invention.

A network comprises a server terminal 1 connected by means of a network to various client terminals 2, 3, 4. The terminal 2 is, for example, a terminal of portable telephone type. The terminal 3 is a portable computer. The terminal 4 is a digital television. Other types of terminals may of course be connected to the server terminal 1.

The server 1 comprises a content adaptation module 6 according to one embodiment of the invention.

The client terminals 2, 3, 4 are capable of receiving a content in the MPEG-4 format but adapted according to their capability. In MPEG-4 terminology, the capability of a terminal is also known as its profile. For example, the portable telephone does not have as large a display capability as the television or the portable computer, thus its possibilities in terms of display are restricted and it will not be able to display data having the same resolution or geometrical shapes which are as complex as a television.

The profiles as defined in the MPEG-4 standard are hierarchical. The lowest profile being the profile corresponding to the terminal having the smallest overall capabilities.

In the MPEG-4 standard, the profiles are defined for each part of the standard:

Video,
Audio,
Graphics,
Scene data (also referred to as "Scene Graph"),
DMIF (the acronym standing for "Delivery Multimedia Integration Framework"),
OD (the acronym standing for "Object Descriptor"),
MPEG-J.

Each profile defines a suite of functionalities sufficient for certain applications, for example for service quality requirements.

Each profile, in the MPEG-4 standard, is also split into several levels.

Each level defines parameters such as the graphical resolution or the bit rate of the data for example.

The combination of the levels and of the profiles defines the performance of a device or terminal.

In order to avoid the need for the content creator to create a specific content adapted to each profile, it is desirable to create a content which will be understood by all the terminals.

This also makes it possible not to transmit, in the form of a prerecorded transmission, on the network the same content according to various profiles but to transmit a single content which can be split into various profiles simultaneously to all the terminals.

Figure 3:
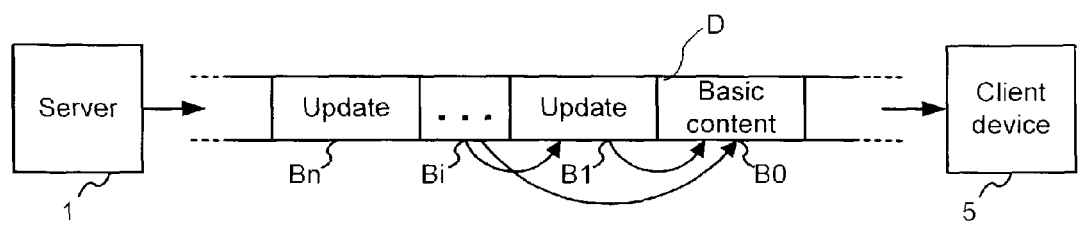
FIG. 3 represents an exemplary data stream according to a second embodiment of the invention.
Figure 4:
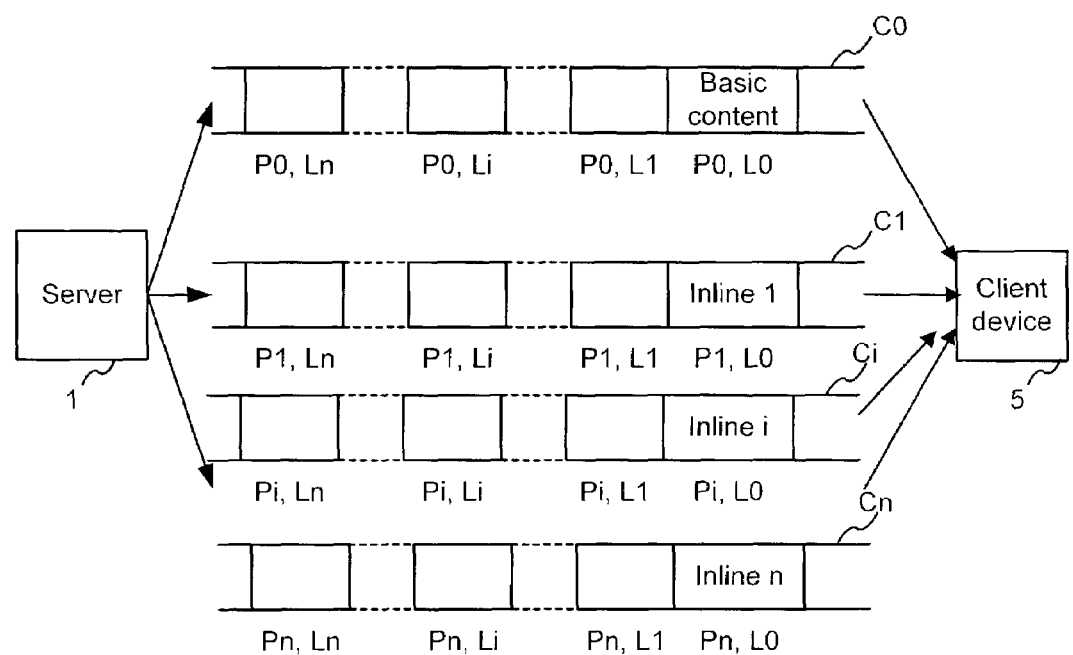
FIG. 4 represents an exemplary data stream according to a third embodiment of the invention.

The server therefore creates a single data stream intended for all the terminals but adaptive, allowing each terminal to display a content adapted to its capabilities. An exemplary stream is illustrated in FIGS. 2, 3, 4.

Figure 2:
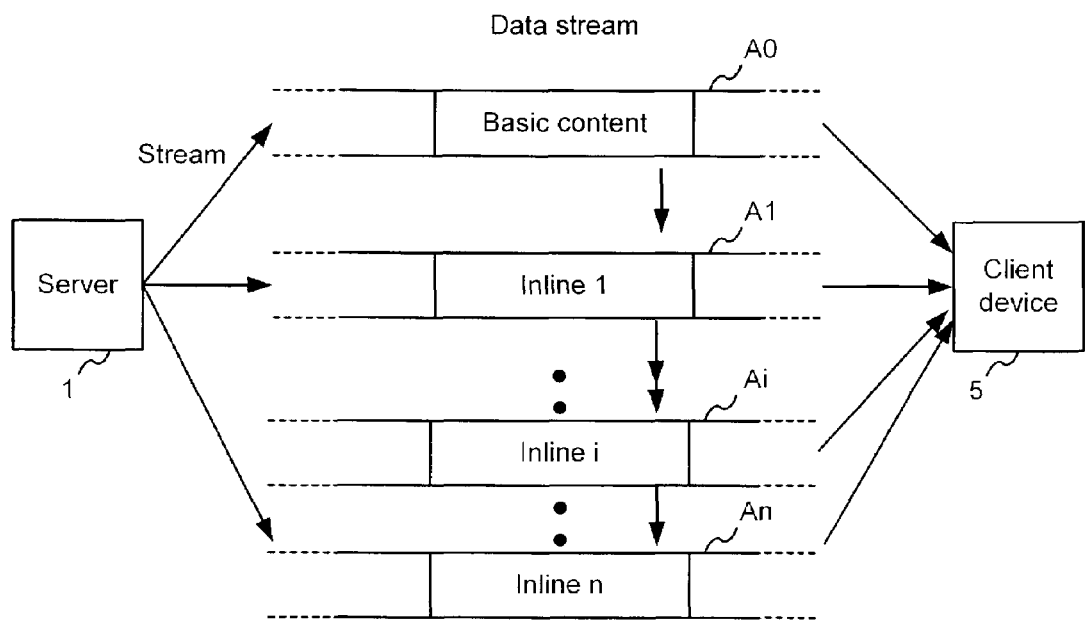
FIG. 2 represents an exemplary data stream according to a first embodiment of the invention.

FIG. 2 represents a data stream according to a first preferred embodiment of the invention.

A server 1 is connected to a terminal 5 by way of a communication network. A single terminal 5 is illustrated in FIG. 2 but several different types of terminals as illustrated in FIG. 1 may be connected.

According to this embodiment, the data are transmitted in data groups, each data group being transmitted in a different stream $A_0, A_1, \ldots, A_i, \ldots, A_n$.

Preferably, the streams $A_0, A_1, \ldots, A_i, \ldots, A_n$ can be transmitted using the carousel mode. This signifies that they are transmitted in a recurrent manner from the server to the terminal 5 while possibly being temporarily updated.

According to a variant, the streams $A_0, A_1, \ldots, A_i, \ldots, A_n$ can be transmitted in a periodic manner.

The data streams are created by a content adaptation module 6 as illustrated in FIG. 1 by using the "BIFS Inline" type nodes defined in the MPEG-4 standard.

The server 1 generates several data streams $A_0, A_1, A_i, \ldots, A_n$ comprising the content of the MPEG-4 scene to be transmitted to the various client terminals such as the terminal 5.

Each data group comprises a header referencing the profile to which the data of the group are adapted. Thus, during reception, the terminal 5 receives the streams comprising the data groups and compares the reference of the profile in each data group. It decodes a data group only if the profile with which this data group is associated is lower than or equal to its profile.

The stream $A_0$ consists of a stream comprising a so-called basic content comprising data associated with the profile 0.

The stream $A_1$ comprises data associated with the profile 1.
The stream $A_i$ comprises data associated with the profile i.
The stream $A_n$ comprises data associated with the profile n.

Each data group comprises data representing the entire data of the scene according to a profile.

Each stream is composed of data groups comprising the data representative of the scene and of a so-called "BIFS inline" node pointing to the data stream associated with the higher profile.

The terminal 5 first of all analyses the stream $A_0$ and thus recovers the data associated with profile 0.

If the profile associated with the terminal 5 is not profile 0, but a higher profile, it recovers, by virtue of a pointer present in the stream $A_0$ and referencing the inline 1 node present in the stream $A_1$, the information associated with profile 1 in the stream $A_1$.

With the information of profile 1, it updates the information of profile 0 so as to obtain a profile 1 content.

If the profile associated with the terminal 5 is higher than the level 1 profile, it recovers, by virtue of a pointer present in the stream $A_1$ and referencing the inline 2 node present in the stream $A_2$, the information associated with profile 2 in the stream $A_2$.

This update procedure is repeated for as long as the data recovered from the stream are of lower profile than the profile of the terminal 5.

When the terminal 5 has recovered the data associated with its profile, it can process them.

Thus each terminal connected to the server 1 receives the same streams as input, thus allowing simultaneous sending (or broadcasting) to all the terminals and reducing the occupancy of the bandwidth. Thus as a function of its own profile each terminal recovers the data which its capability allows it to process.

The data groups can be considered as encapsulated in one another. Each data group points to another stream containing a data group of immediately higher profile. Each data group is representative of the complete scene and gives a representation of the scene according to the profile to which it makes reference.

According to a variant of this embodiment, each stream $A_0, A_1, \ldots, A_i, \ldots, A_n$ can transport data groups corresponding not only to different profiles but also to different levels.

FIG. 3 represents another exemplary deployment of a data stream according to the invention.

This embodiment is based on the use of the "BIFS update" type commands known in the MPEG-4 standard.

In this embodiment, a server 1 generates a single data stream D comprising various data groups intended for one or more (not represented) client terminals 5. Each data group is associated with a separate profile $P_i$.

The stream comprises a data group, the so-called group $B_0$, representative of a content associated with the lowest profile $P_0$ referred to as the basic content.

The terminal 5, when it receives the data stream D, takes the basic content $B_0$ into account. If its profile is higher than the profile of lowest level $P_0$, it takes into account the data present in the data group $B_1$ corresponding to the immediately higher profile $P_1$. This data group comprises an update of the data of the basic group and not the entire data corresponding to the profile $P_1$.

Each data group $B_i$ comprises an update of the data with respect to the profile of immediately lower level. Thus, in order to obtain a content adapted to the profile $P_n$, the updating of the content is carried out progressively, traversing the profiles of lower level while complying with the hierarchy for the profiles. Each data group $B_0, B_1, \ldots, B_i, \ldots, B_n$ does not therefore allow a complete representation of the scene but an update with respect to the data groups of hierarchically preceding profiles.

According to this embodiment, the data groups $B_0, B_1, \ldots, B_i, \ldots, B_n$ do not comprise any header comprising the index number of the profile to which the data make reference. The data groups comprise information allowing each data group to point to the content of one of the data groups of lower profiles.

In a preferred embodiment, the information allowing each data group to point to the content of one of the data groups of lower profiles comprises at least one temporal label making it possible to recover the data group of immediately next profile so as to perform the updating in a sequential manner.

This temporal label consists, preferably, in the CTS field known in the MPEG-4 standard and standing for "Composition Time Stamp".

The decoding of the streams, at the level of the terminal 5 is carried out while complying with the order imposed by the CTS temporal labels.

In a preferred embodiment, the data group $B_0$ of the profile $P_0$ comprises a field signifying that it constitutes the first data group. This field consists of the RAP bit (the acronym standing for "Random Access Point") defined in the MPEG-4 standard.

When the terminal 5 receives a data group comprising the RAP field, it reinitialises its content and loads the content of this new data group.

Thereafter, it decodes the data groups received in the order imposed by the CTS field and stops as soon as it has decoded a data group whose profile is higher than its profile. Thus, if the terminal 5 has a profile $P_4$, it decodes the data groups until the profile $P_5$ and rejects these data when it realizes that they are of higher profile than its own; it therefore rejects the data corresponding to the profile $P_5$.

FIG. 4 represents a third embodiment of the invention illustrating the chopping of the profiles into various levels.

According to this embodiment, the two previous embodiments can be combined.

In this embodiment, a server 1 generates several data streams $C_0, C_1, \ldots, C_i, \ldots, C_n$ comprising various data groups intended for one or more (not represented) client terminals 5. Each data group is associated with a separate profile $P_i$.

Each $C_i$ comprises various datagroups.

A stream can, for example, comprise data groups corresponding to the same profile $P_i$ but complying with different levels.

The profiles are referenced $P_i$ and the levels are referenced $L_i$.

The data group corresponding to profile $0$, $P_0$, and to level $0$, $L_0$, comprises the basic content. This data group also comprises a "BIFS Inline" type node making it possible to point to the data group corresponding to profile $1$, $P_1$ and to level $0$, $L_0$. It also comprises the RAP type field signifying that it corresponds to the first data group allowing an updating of the scene. Before decoding this data group, the terminal 5 resets its data to zero so as to consider these new data as basic data corresponding to a new scene.

Each data group of profile X and of level $0$ comprises a pointer referencing the node Inline X+1 present in the stream $C_{x+1}$.

Each data group also comprises a CTS temporal label. This temporal label makes it possible to order the updating of the scene as a function of the levels $L_i$ of each profile.

Each terminal 5, when it receives the various streams $C_i$, decodes the data groups by first of all decoding the data group of profile $P_0$ and of level $L_0$, which it tags by virtue of its RAP field. Thereafter it decodes the various temporal labels of the other packets so as to reconstruct the scene according to a level corresponding to its own If its profile is $P_i$ and its level is $L_k$ in the profile $P_i$, it thus decodes all the levels of all the profiles hierarchically preceding the profile $P_i$ and all the corresponding levels as far as level $L_{k+1}$ in profile $P_i$. When it reaches level $L_{k+1}$, it realizes that it cannot process the data of this level and therefore stops decoding the data. Decoding should also be understood to mean interpretation.

In the various embodiments given hereinabove, the data streams $A_i$, D, $C_i$ can also comprise data other than the groups of data representative of the splitting in terms of profile $P_i$ or level $L_i$. These data may be video, audio data needed by the various scenes to be displayed and to which scenes the data groups can point. The streams $A_i$, D, $C_i$ can therefore comprise various multiplexed data.

In a preferred embodiment, the data included in the data groups are compressed. The terminal 5 decompresses them before processing them.

The invention claimed is:

1. A data transmission device for transmitting data to a plurality of client devices, the data being transmitted according to a plurality of predetermined profiles, each one of the plurality of client devices being associated with at least one of the plurality of predetermined profiles, the data transmission device comprising:
   means for adapting content of the data to be transmitted as a function of the plurality of predetermined profiles by generating data groups, each one of the data groups representing the content to be transmitted according to one of the plurality of predetermined profiles;
   means for creating a single data stream encapsulating the data groups adapted to the plurality of predetermined profiles so that each respective client device of the plurality of client devices is able to recover from the single data stream any of the data groups adapted to the at least one of the plurality of predetermined profiles associated with the respective client device;
   means for transmitting the single data stream to the plurality of client devices; and
   wherein the plurality of predetermined profiles define hierarchical levels of capabilities of the plurality of client devices and wherein one of the data groups references content of a lowest one of the plurality of predetermined profiles and at least one of the data groups comprises data for enabling modification of the data group referencing the content of the lowest one of the plurality of predetermined profiles so as to obtain other said data groups each referencing one of the plurality of predetermined profiles of a higher level.

2. The data transmission device according to claim 1, wherein the means for creating the single data stream inserts a pointer into the data groups associated with one of the plurality of predetermined profiles, the pointer enabling reference to another one of the data groups complying with another one of the plurality of predetermined profiles.

3. The data transmission device according to claim 1, wherein the data groups encapsulated in the single data stream are transmitted in a carousel mode.

4. The data transmission device according to claim 1, wherein the data groups include a header comprising at least one temporal label.

5. The data transmission device according to claim 1, wherein the means for creating the single data stream inserts a node into the data groups associated with one of the plurality of predetermined profiles, the node pointing to one of the data groups of an immediately higher one of the plurality of predetermined profiles.

6. The data transmission device according to claim 5, wherein the node points to another data group situated in another data stream.

7. The data transmission device according to claim 1, wherein at least one of the data groups comprises a header indicating at least the predetermined profile to which the data of the data group is adapted.

8. A method for transmitting data from a data transmission device to a plurality of client devices, the data being transmitted according to a plurality of predetermined profiles, each one of the plurality of client devices being associated with at least one of the plurality of predetermined profiles, the method comprising steps of:
   adapting content of the data to be transmitted as a function of the plurality of predetermined profiles by generating data groups, each one of the data groups representing the content to be transmitted according to one of the plurality of predetermined profiles;
   creating a single data stream encapsulating the data groups adapted to the plurality of predetermined profiles so that each respective client device of the plurality of client devices is able to recover from the single data stream any of the data groups adapted to the at least one of the plurality of predetermined profiles associated with the respective client device;
   transmitting the single data stream to the plurality of client devices; and
   wherein the plurality of predetermined profiles define hierarchical levels of capabilities of the plurality of client devices and wherein one of the data groups references content of a lowest one of the plurality of predetermined profiles and at least one of the data groups comprises data for enabling modification of the data group referencing the content of the lowest one of the plurality of predetermined profiles so as to obtain other said data groups each referencing one of the plurality of predetermined profiles of a higher level.

* * * * *